United States Patent [19]
Karow

[11] Patent Number: 5,579,030
[45] Date of Patent: Nov. 26, 1996

[54] METHOD AND APPARATUS FOR DISPLAY OF TEXT ON SCREENS

[75] Inventor: Peter Karow, Hamburg, Germany

[73] Assignee: Adobe Systems Incorporated, Mountain View, Calif.

[21] Appl. No.: 312,936

[22] Filed: Sep. 29, 1994

[30] Foreign Application Priority Data

Nov. 18, 1993 [EP] European Pat. Off. .............. 93250316

[51] Int. Cl.⁶ ..................................................... G09G 5/22
[52] U.S. Cl. ........................... 345/143; 345/132; 345/136
[58] Field of Search ...................................... 345/132, 136, 345/137, 147, 149, 126, 143

[56] References Cited

U.S. PATENT DOCUMENTS

| | | | |
|---|---|---|---|
| 4,486,785 | 12/1984 | Lasher | 345/147 |
| 4,591,844 | 5/1986 | Hickin | 345/147 |
| 4,672,369 | 6/1987 | Preiss | 345/132 |
| 4,720,705 | 1/1988 | Gupta | 345/136 |
| 4,783,652 | 11/1988 | Lumelsky | 345/132 |
| 4,827,255 | 5/1989 | Ishii | 345/148 |
| 4,851,825 | 7/1989 | Naiman | 345/149 |
| 4,907,282 | 3/1990 | Daly | 345/147 |
| 4,908,780 | 3/1990 | Priem | 345/136 |
| 4,945,351 | 7/1990 | Naiman | 345/147 |
| 5,386,509 | 1/1995 | Suzuki | 345/136 |

FOREIGN PATENT DOCUMENTS

| | | | |
|---|---|---|---|
| 0214547 | 3/1987 | European Pat. Off. | 345/149 |
| 0428356 | 5/1991 | European Pat. Off. | 345/147 |
| 0468652 | 1/1992 | European Pat. Off. | 345/147 |
| 8604703 | 8/1986 | WIPO | 345/147 |

Primary Examiner—Raymond J. Bayerl
Assistant Examiner—Matthew Luu
Attorney, Agent, or Firm—Nixon & Vanderhye

[57] ABSTRACT

Text and graphics are represented on video screens having a given raster of screen pixels in x- and y-directions and video refresh memories. The necessary glyphs are loaded in an outline format from a memory and get rastered alongside their contours (gridwalk). In order to achieve a better quality of display, the glyphs are represented in grey by calculation of positions, rotations and scalings at a higher resolving fine-raster where there are m fine-pixels in x- and n fine-pixels in y-direction for each screen pixel (m, n>1) and each glyph is rastered alongside its outline either as bitmap or as run length code. For each of the m×n fine-pixels, screen pixels are generated according to the character's text position in fine-resolution by adding the bit values of corresponding black fine-pixels and calculating a grey-value according to their sum in relation to all m×n fine-pixels and storing these grey-values into the video refresh memory having a depth sufficient to store the maximum of different grey values (for example: 2bit, halfbyte, byte).

14 Claims, 11 Drawing Sheets

Aus dem bislang meist mathematischen Umsetzen der Buchstabenformen mit Hilfe eines Computers wird es als kreativer Prozeß bald möglich sein, mehr und mehr mit Buchstaben und einzelnen Wortbildern neuartige und attraktive Lösungen zu erzeugen. Das IKARUS-System war der Anfang für eine neue Dimension in der Wiedergabe von Schriftzeichen. Es wird weiterhin seinen Einfluß geltend machen, wenn für neue Anwendungsgebiete ästhetisch einwandfreie Schriftzeichen verlangt werden.

Ein auf einem Chip gespeichertes Alphabet von hoher digitaler Genauigkeit und Formqualität wird uns dann helfen, viele der jetzigen, oftmals recht primitiven Schriftzeichen auf unseren Sichtgeräten und auf Computerausdrucken in schöne Schriftzeichen zu verwandeln, in Alphabete, wie wir sie seit Jahrhunderten durch die hohe Qualität der Gutenbergischen Druckkunst gewohnt sind. Was damals selbstverständlich war, sollte als Standard auch in der Zukunft im digitalen Bereich möglich werden.

Fig. 4a

Aus dem bislang meist mathematischen Umsetzen der Buchstabenformen mit Hilfe eines Computers wird es als kreativer Prozeß bald möglich sein, mehr und mehr mit Buchstaben und einzelnen Wortbildern neuartige und attraktive Lösungen zu erzeugen. Das IKARUS-System war der Anfang für eine neue Dimension in der Wiedergabe von Schriftzeichen. Es wird weiterhin seinen Einfluß geltend machen, wenn für neue Anwendungsgebiete ästhetisch einwandfreie Schriftzeichen verlangt werden.

Ein auf einem Chip gespeichertes Alphabet von hoher digitaler Genauigkeit und Formqualität wird uns dann helfen, viele der jetzigen, oftmals recht primitiven Schriftzeichen auf unseren Sichtgeräten und auf Computerausdrucken in schöne Schriftzeichen zu verwandeln, in Alphabete, wie wir sie seit Jahrhunderten durch die hohe Qualität der Gutenbergischen Druckkunst gewohnt sind. Was damals selbstverständlich war, sollte als Standard auch in der Zukunft im digitalen Bereich möglich werden.

METHOD AND APPARATUS FOR DISPLAY OF TEXT ON SCREENS

BACKGROUND OF THE INVENTION

1. Field of the Invention

The present invention relates to a method and apparatus for displaying text and graphics on a video display device comprising a screen with a display raster having a given number of lines of pixels in the x- and a given number of consecutive lines in the y-direction, and a video refresh memory, said method using glyphs (characters and similar graphic symbols and elements) formatted in an intelligent outline description which are loaded from memory on demand and scaled, rotated, and positioned according to text processing requirements and rastered by pixels being placed along their contours by one of the existing scalers.

2. Related Art

Improvements in the quality of visually displayed text have a major influence on its usefulness in word processing. Current problems are two-fold:

—an A4 page (about 60 lines, each containing 60–80 characters) cannot be represented on a single screen in a readable manner; and —typographically low quality means hard-to-read typesetting. What we see is what we get is the popular concept of computer generated "exact" bitmaps as an ugly and fatiguing medium of communication.

Video monitors represent characters and other graphic symbols in a rastered form. Usually, video screens have about 500 to 1000 television lines (TV-lines), each consisting of around 600 to 1200 pixels. Without limiting generality, in some places it is assumed in the following that a pixel length (x-direction) equals the line width (y-direction) so that the pixels are squares. Any colour can be displayed at each pixel, i.e. different intensities of the colours red, green, and blue. Texts are often represented in black and white by displaying appropriate white and black values, generated by an even intensity of red, green and blue depending on the lightness desired. In the following, a black and white text display with all its shades of intermediate grey-values is considered as representive for a general text display in any colour and its shades.

Within the framework of office automation and desktop publishing, text display plays a key role. Since 1980, all computer and operating software manufacturers have made considerable efforts to improve the quality of text display on screens, namely to obtain rastered characters for screen display which maintain to the maximum extent possible the readability of the rastered characters and which maintain the specific character form and shape as it later appears when output on high resolution devices (laser printers, laser recorders and so on). These attempts have been called "WYSIWYG" (What You See Is What You Get).

Figure 1A:
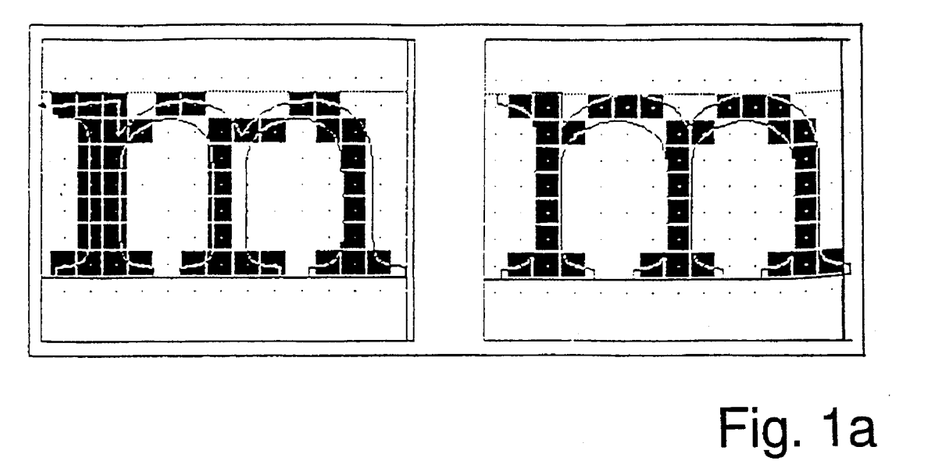
FIG. 1a: is a raster representation of a glyph, on the left side simple rastering, on the right intelligent outline rastering using stem contol.
Figure 1B:
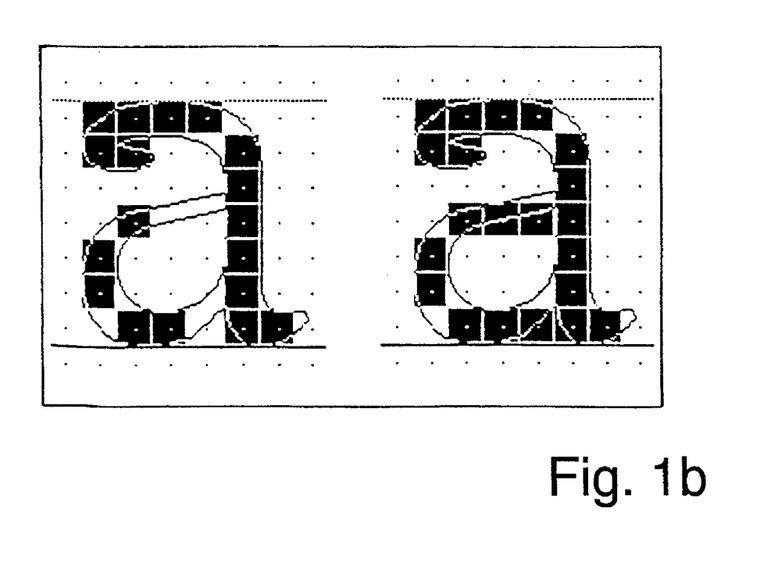
FIG. 1b: is a raster represrentation of glyphs, on the left side simple rastering, on the right intelligent outline rastering using dropout control.

Various manufacturers have developed data formats for storing and representing characters and other graphic elements, called "intelligent digital outline formats". Characters are formed by black strokes that cover a certain area and whose contours are described by, mostly short, vectors and/or curved lines. Arcs (circle segments), as well as quadratic and cubic splines (curves generated by a spline function) are often used as such contour curves. Additionally, these contour descriptions are stored together with so called instructions (or hints) which are used in the rasterisation step in order to avoid bad accidental effects of quantisation, which may be caused when rastering in a coarse raster. Such bad effect is for example: rastering the character "m" so that all three vertical strokes have different widths, measured in pixels (see FIG. 1a on the left side); or rastering very thin stems so that no black pixels are generated along the stroke (see FIG. 1b on the left side). To avoid these random effects, instructions have been introduced for "stem control", "drop out control" and other controls. Applying these instructions avoids bad accidental effects as shown on the right in FIGS. 1a and b. A more detailed treatment of modern intelligent outline formats is available in literature, for example "Digital Typefaces" by Peter Karow, Springer Verlag, 1993, chapter 8, and "Font Technology" by Peter Karow, Springer Verlag, 1994, chapter 7, wherein these more detailed descriptions are incorporated by refence. Some of the widely used formats like PostScript Type1, TrueType, and IKARUS are described in these references.

The rasterisation speed is one of the most important criteria for a scaling program (scaler) which converts outline character formats like PostScript Type1, TrueType or IKARUS into a bitmap representation of the characters for display on a video screen. For example, when using a text processing program, one deletes a character in the text and would like to see the changed text page displayed instantaneously, i.e. with the mimimal possible delay or response time. The delay, however, mainly depends on the speed of the scaler. In all common methods, one can distinguish four steps, each needing about the same processing time for a typical text typeset in a typeface such as Times Roman at 12 pt (1 pt=$\frac{1}{72}$ inch, pt is read as "point").

1. load: load a typeface's digital font, decompress it, initialize administration and parameters.
2. gridfit: interpret instructions and reconfigure the contours to fit into the desired raster grid.
3. gridwalk: calculate, using the vectors and curved line descriptions of the contour of the character, all pixels along the contours.
4. bitfill: fill-in all other black pixels in-between the two contour pixels belonging to the black stroke areas of the character. Usually a white pixel is represented by a bit value "0" and a black by "1".

A bitmap for each character or graphic element results from such rasterisation. This bitmap is copied to a certain location in the video refresh memory (video-RAM) corresponding to certain location on the screen which location was calculated during text processing and is specified in screen-coordinates, i.e. the coordinates are rounded off from original text-coordinates that were calculated at a higher resolution of e.g. 2400 lpi (lpi=lines per inch) or $\frac{1}{20}$ pt (1 pt=$\frac{1}{72}$ inch) to the coarser screen raster resolution, thus losing positional accuracy by quantyzing the position in units of one screen pixel.

Screen pixels are relatively large and are typically 1 pt in both the x- and y-directions (i.e. $\frac{1}{72}$ inch×$\frac{1}{72}$ inch). Therefore, one has a relatively coarse character representation, especially in sizes typical for writing text, such as 10 pt. Consequently, rasterisation leads to insufficient readability and legibility for all smaller text sizes (pointsizes). Additionally, character widths are specified in integer pixel units, and one has screen positions rounded to integer pixel units as well as rounded line positions. So, the overall text display suffers from these deficiencies, showing bad word images and varying line widths.

For better text representation on current video screens, a more accurate indication of character positions in relation to one another is desired than can be achieved by using a 1 pt unit. The same would be true for line positions. As a comparison, it is noted that craftsmen in printing use ¼ pt as the largest unit in publishing (typography). There are reasons why it is too expensive to get a resolution four times higher in both directions on the video screen, therefore one has to find a different way to increase text legibility and graphic perception with today's screen resolutions of about 72 lpi.

From European Patent Application EP 0 132 456 a method is known for monitoring the typesetting quality on an electronic typesetting machines, namely by displaying the page layout on a video monitor. In the electronic typesetter there is stored a high resolution bitmap of an entire page for exposing a film with this page. To allow to monitor or check the page layout on a video screen before exposure of the film, the entire page bitmap is accessed and converted to a coarser raster of the video screen. This is done by summing up m consecutive pixels in n consecutive lines, then calculating a grey value of that m×n area in dependence of the sum of bit values of the bitmap in this m×n area. This grey value is assigned to the screen pixel. This type of method is not feasible for displaying text on personal computers (PCs) or the like because a high resolution bitmap of a page is needed which is usually generated using a special driver or hardware in an output device (RIP, Raster Image Processor) like a printer which prints the page with high resolution. The generation of a high resolution bitmap of a page is time consuming, and this page bitmap would then have to be transferred from the Raster Image Processor back to the video RAM of the screen afterwards. Altogether this would not result in the fast and inexpensive display required for text processing. In particular, such a method would cause an entirely new calculation of the page-image if just one character was deleted or inserted. Therefore, the above method cannot be used in view of speed requirements for interactive display applications.

European Patent Application EP 0 215 664 discloses a method and apparatus for constructing and displaying characters. Each character is represented by spline functions describing its contour. The contour is overlayed with a grid corresponding to the raster of the output device (screen), and the grid squares through which the contour line passes are identified as boundary pixels. For each of these boundary pixels it is taken into account that the pixel square may be partly filled only by the character area inside the contours. This is performed by using the spline functions crossing the respective boundary square to calculate the "inside area" being within the contour in this pixel square. The value representing the inside area in relation to the total pixel square area gives a grey scale factor on a scale of 0 to 1. This factor represents the relative intensity at which the pixel will be diplayed. The character is then filled in by turning on all pixels between boundaries. Although this method achieves a slightly improved legibility the results are not satisfying. This is mainly due to the fact that the character position is sampled or quantized in units of the screen pixel size, and that the resulting grey scaled character is independent of the relative position of the character with respect to the pixel grid and to neighbouring characters. Furthermore, the disclosed calculation of grey scale factors for all boundary pixels of a character is, although approximative calculations are used, very time consuming since a large number of time consuming mathematical operations have to be processed which results in unacceptable response times for interactive display purposes.

European Patent Application EP 0 428 356 discloses a pattern generation method and apparatus in which a character is sampled or rastered to an internal bitmap of a grid which has an n times higher resolution than the actual output resolution. To reduce the internal bitmap to a pixelmap for the output device the bit values of the internal pixels belonging to one output pixel are summed up for each output pixel. Depending on the sum of black internal bitmap pixels within each output pixel, a grey scale value is assigned to each output pixel. This method is somewhat faster than the above calculation of grey values but it suffers from the same fundamental difficulties which result from the character positioning and grey value calculation not taking into account the character fine position with respect to the internal grid of higher resolution.

The present invention improves text and graphic display with a speed acceptable for interactive applications on video screens, using common resolutions in which legibility and display quality are increased compared to today's common methods.

SUMMARY OF THE INVENTION

According to the invention a method and apparatus is provided for displaying text and graphics on a video display device 10 comprising a screen 11 with a display raster having a given number of lines of pixels in the x- and a given number of consecutive lines in the y-direction, and a video refresh memory 12, said method and apparatus using glyphs (characters and similar graphic symbols and elements) formatted in an intelligent outline description which are loaded from memory 13 on demand and scaled, rotated, and positioned 15 according to text processing 14 requirements and rastered 16 by pixels being placed along their contours by one of the existing scalers (gridwalk), wherein the glyph rasterisation is done glyph by glyph as they appear in the text as needed, in a high resolution raster 16 (fine-raster) in which each screen pixel is more finely resolved with m fine-pixels in the x- and n fine-pixels in the y-direction, m and n being integers larger than 1, and in which each glyph is represented either as bitmap along the contour or as run length code and stored in a cache-memory 17, wherein, depending on each glyph's position as provided by the text processing 14, one out of m×n different positions of said stored fine-rastered glyph relative to the screen raster is determined 18, which positions define m×n different ways for the fine-pixels of the glyph to fall as respective groups of m×n fine-pixels into respective screen pixels, and wherein for each screen pixel the group of m×n fine-pixels falling in said screen pixel is summed 18 up by adding their bit values to determine a grey-value for said screen pixel, depending on the sum of black fine-pixels in relation to the number of m×n fine-pixels, the determined grey value is stored in the video refresh memory having a bit-depth sufficient to store the desired number of greyshades (2bit-, halfbyte-, byte-map memory 12), thus providing one out of m×n glyph variants from each cache-stored, fine-rastered glyph.

Using this invented method and apparatus, one has (1.) an improved presentation of a single glyph, (2.) a better positioning of characters relative to each other in a word and line, (3.) a better positioning of lines among each other, and (4.) therefore an increased text readability and legibility and improved images of similar graphic elements.

In the present invention it is an essential advantage that the grey scaling may be performed very quickly so there is no disadvantage compared with today's common scalers that only generate bitmaps. Therefore the method of this invention is very well suited to interactive text processing where pages need to be displayed immediately after editing.

In the first step of the invented method apparatus, each glyph is rastered in a higher resolution or fine-raster having, for each screen pixel, m fine-pixels in the x- and n fine-pixels in the y-direction. Each glyph is scaled according to one of the known scalers, and the gridwalk produces either a bitmap along the contour or a run length coded glyph. The glyph representation is provided in bit representation containing 0 or 1 for black or white, or colour-on or colour-off, and no further shades are provided in-between them.

In the next step the position of each glyph as provided by the text processing is used to determine one out of m×n different positions of said stored fine-rastered glyph relative to the screen raster. These different positions are present since the glyph may be shifted by units of fine-pixels within the screen grid, and after each shift the pattern of respective groups of m×n fine-pixels being contained in respective screen pixels may be different. In total there are m×n possible different patterns of fine-pixels within the screen grid, or m×n possible shifts after which the patterns repeat.

According to the particular position determined for the glyph, for each screen pixel the group of m×n fine-pixels falling in said screen pixel is summed up by adding their bit values to determine a grey-value for said screen pixel, depending on the sum of black fine-pixels in relation to the number of m×n fine-pixels, the determined grey value being stored in the video refresh memory in the memory location corresponding to said pixel, and the pixel being later displayed with an intensity corresponding to the grey value. The video refresh memory has to have a capacity per pixel or a bit-depth sufficient to store at least the desired number of greyshades (2bit-, halfbyte-, byte-map memory). Thus, the glyph is displayed in one out of m×n glyph variants depending on its position with respect to the screen raster.

In a preferred embodiment the greyshades are defined in (m×n+1) values from white to black, and the sum of the fine-pixel bits is taken as the grey value itself, representing the average colour of the corresponding fine-pixel area. Also, a different distribution of grey values could be calculated, especially in order to represent a non-linear gradation.

In a preferred embodiment, each screen pixel's calculated grey-value is stored in the video refresh memory (at the appropriate screen pixel location) where it is added to already stored grey-values (at the same screen pixel location) from earlier representations of other glyphs. This ensures that narrow spaces between characters are overlaid or superposed in the right manner, that is both characters contribute and add to a darker colour. Most video refresh memories allow an add function during storage, and therefore no efficiency is lost.

According to the method and apparatus of this invention, a clear improvement in readability, legibility and image quality is achieved with no loss in display speed. A special saving in calculation time results because the method of the invention allows omission of the second scaling step (gridfit) mentioned above for the conventional methods, since bad random effects from uncontrolled rasterisation do not play a significant role in the fine-raster. This is due to the fact that the fine-raster has a higher resolution, typically a laserprinter resolution, about 300 lpi. Particularly if high performance is required, the method of the invention omits interpretation and application of any instructions to fit the character into the grid.

As well, there is no need for the fourth scaling step (bitfill) mentioned above because the raster contour line (after gridwalk) in the fine raster is sufficient. The distance between the start and end of black in a stroke area, which should be represented in a TV-line, can be used directly to generate grey values as discussed in more detail below.

BRIEF DESCRIPTION OF THE DRAWINGS

The invention is illustrated in the following description in connection with accompanying figures wherein:

FIGS. 4a,4b: shows presentations of several lines of text written in 9 pt in the typeface Nimbus Roman; on the top, a common bitmap scaler is used, on the bottom a grey scaled image generated by the method of the invention;

FIGS. 9a,9b: show 16 different grey presentations of the character O, obtained by successively shifting the character by one fine-pixel in x- as well as in y-direction (m=4, n=4), FIG. 9a and original screen size, while FIG. 9b is enlarged by a factor 4.

DETAILED DESCRIPTION OF EXEMPLARY EMBODIMENTS

Figure 1C:
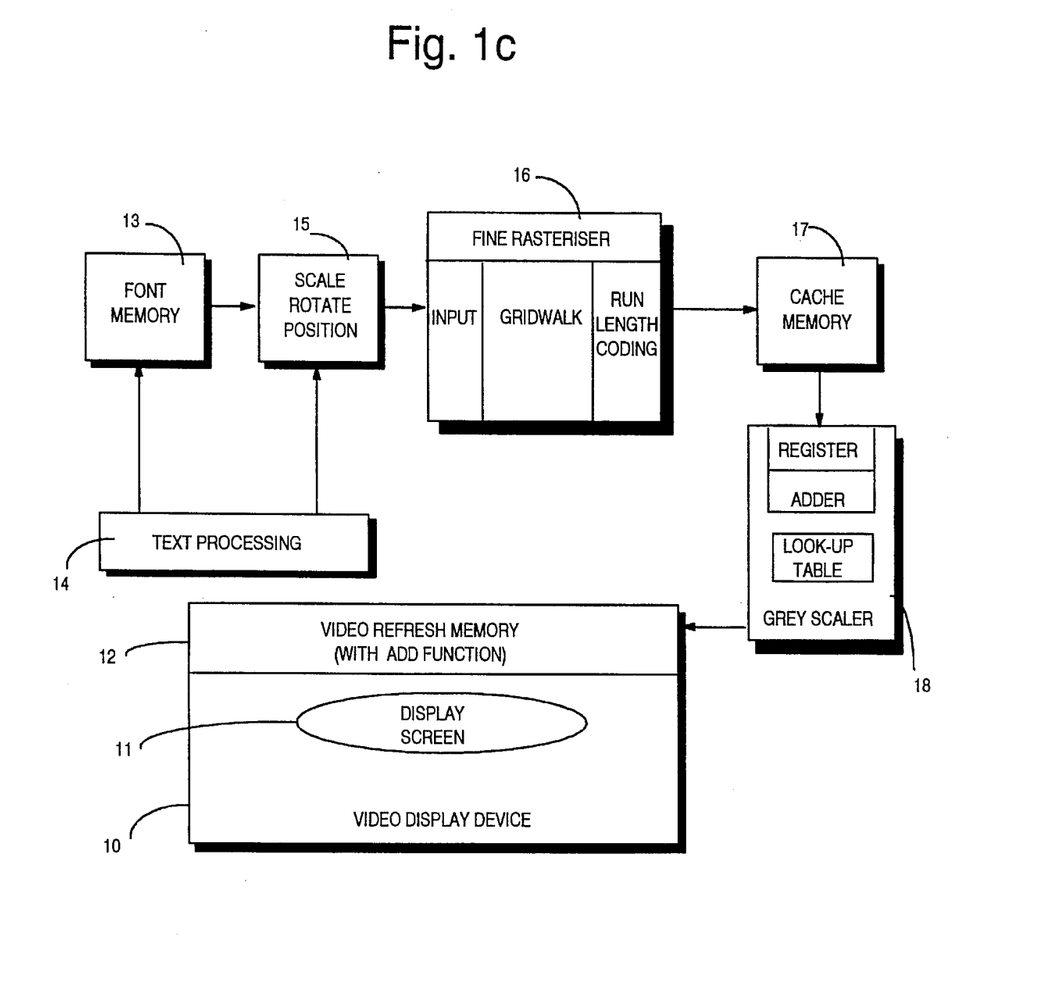
FIG. 1c: is a schematic diagram of exemplary apparatus for implementation of this invention.
Figure 2A:
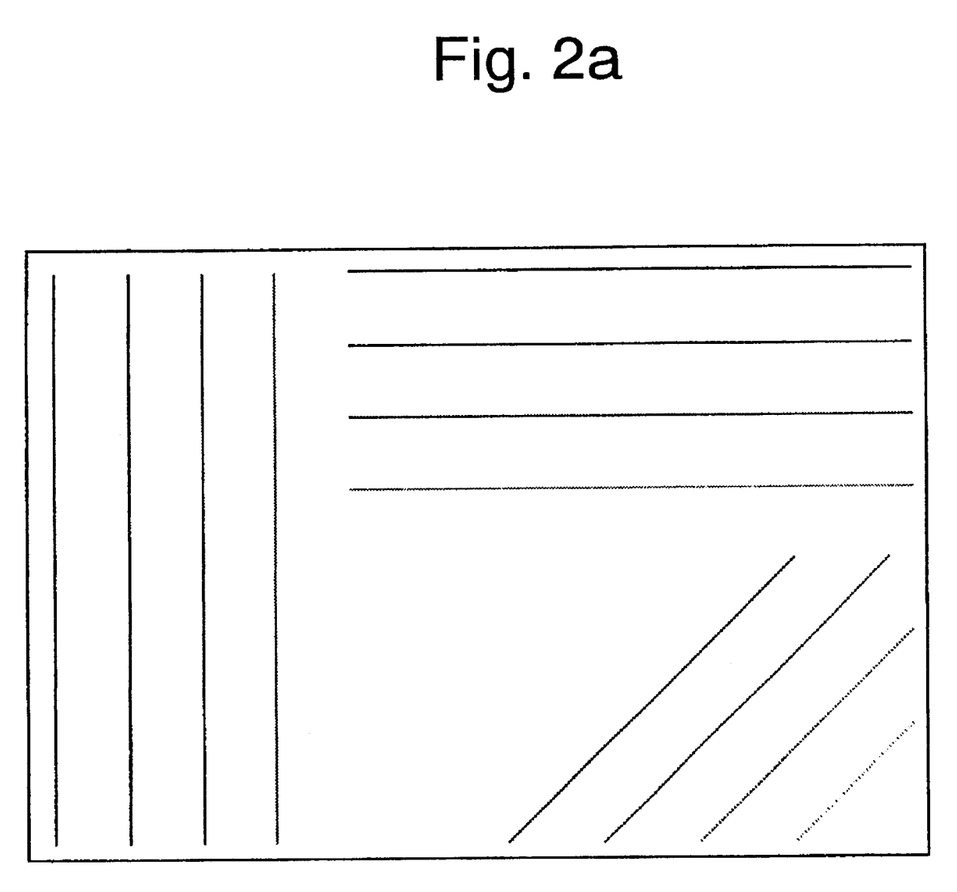
FIG. 2a: shows lines that are one screen pixel wide, with three different grey values (original screen size).
Figure 2B:
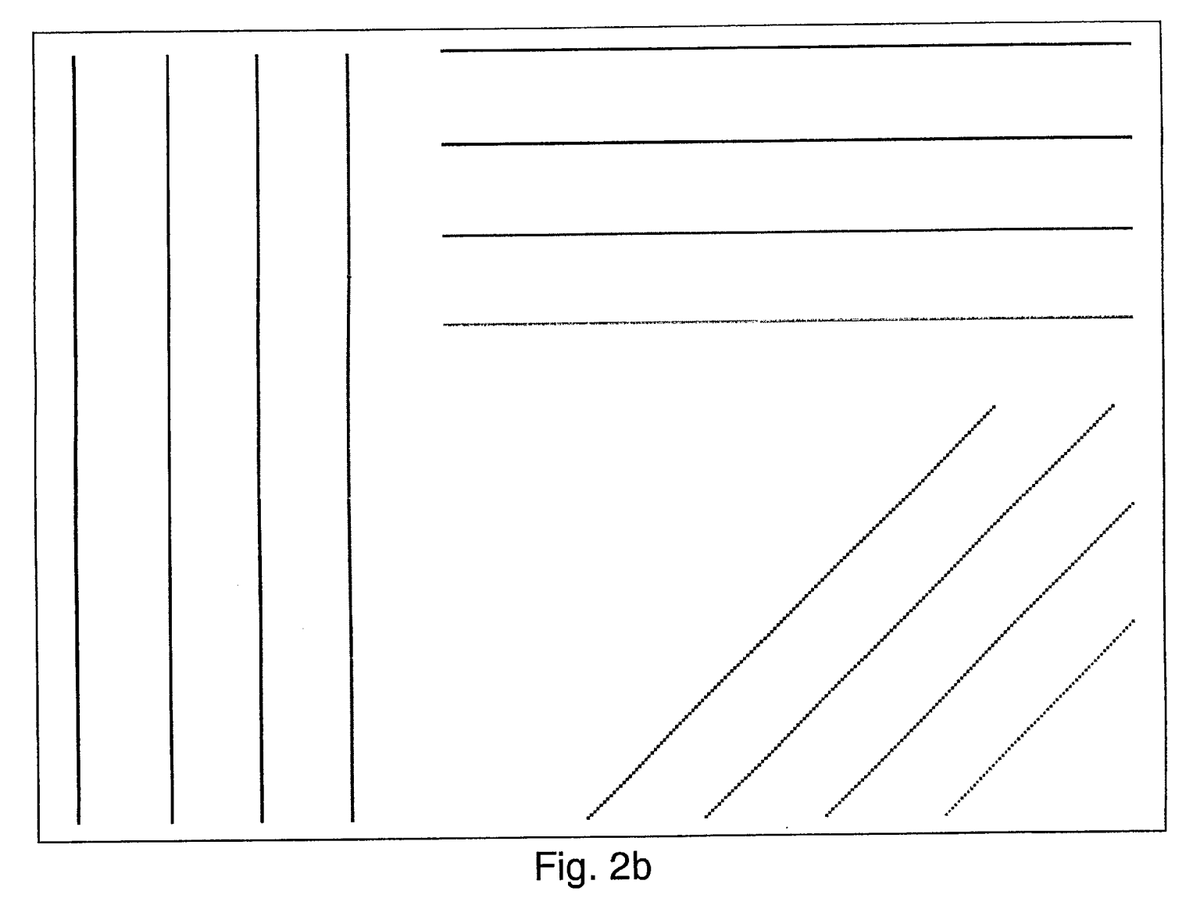
FIG. 2b: shows the lines from FIG. 2a, enlarged two times.

The method and apparatus (see FIG. 1c and description above) of the invention achieves the appearance of providing screen pixels smaller than those actually there. The method uses the following physiological fact: with our eyes, we perceive lines 1 pt wide to be thinner if they are grey. The lighter, the thinner. In FIG. 2a we demonstrate this effect while the enlargement in FIG. 2b shows the actual line widths.

Figure 3A:
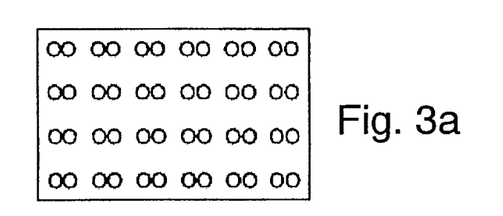
FIG. 3a: Character pairs with various grey values between them (original screen size)
Figure 3B:
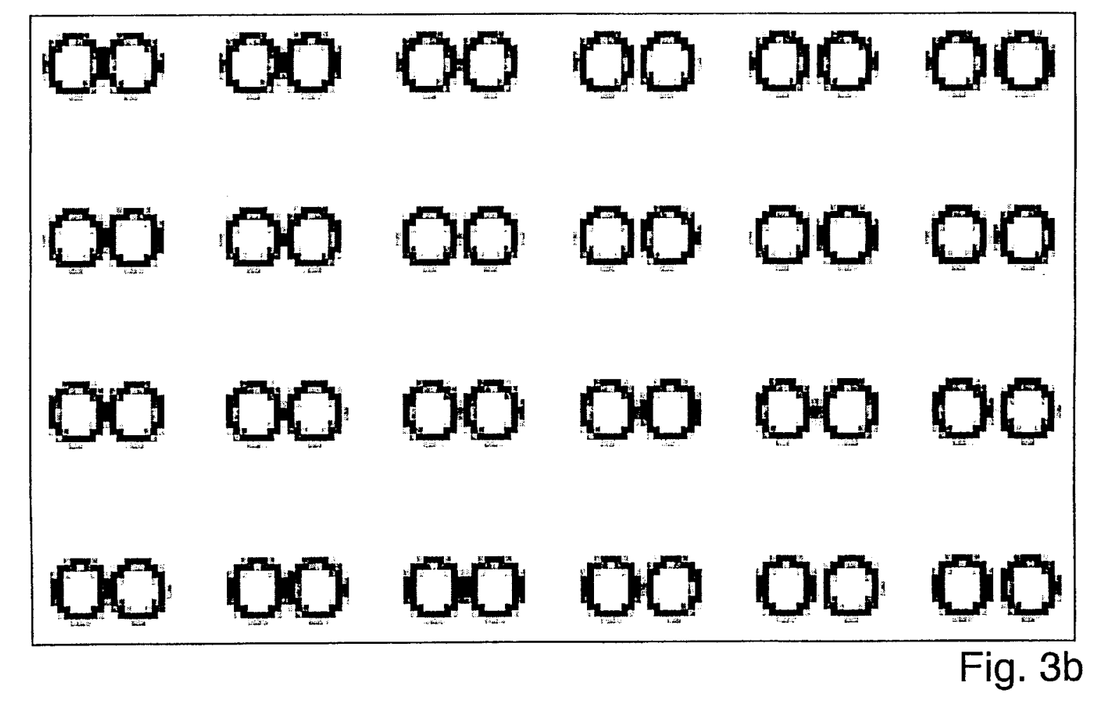
FIG. 3b: shows the character pairs from FIG. 3a, enlarged four times.

Additionally, we perceive a black area to be shifted when actually higher grey-values have been added to one side. As a result, we perceive a shift of the total object in this direction in increments smaller than a screen pixel width. Especially, we already perceive a shorter distance between two characters simply by inserting a grey value between them. The higher the grey-value, the smaller the distance seems, as illustrated in FIG. 3a. FIG. 3b shows an enlargement to prove that it is only an optical effect.

It seems contradictory that greyscaling text by adding shades to the contours results in higher visual quality. Greyscaling is linked to an increase in the visual resolution of video display screens. The position of a stroke can be considered as the integration of luminance over area. This implies that changing the darkness of contour pixels can effectively move the area by a fraction of a pixel. This results in a virtual resolution higher than the screen pixel size.

The difference between a common bitmap presentation of text and a greyscaled presentation is most evident using a text sample consisting of several lines. FIG. 4a shows common bitmapped text and FIG. 4b greyscaled text. The improvement in legibility and the image displayed is easy to see.

Earlier research on video screens (Xerox, Tektronix in "Visual Fatigue and Operator Performance with DVST and Raster Displays", Proc. of the Society for Information Display, Vol. 24, Nr. 1, 1983) demonstrated that test persons fatigued while viewing and fixing upon single greyscaled characters. Greyscaling causes black areas to have a diffused contour, leading to test persons repeatedly trying to refocus the displayed characters, and fatiguing as a consequence.

While reading text, our eyes only quickly focus on a few words, and then jump from one focussed part to the next in so-called saccades. Therefore, about 85% of all text that is read is being viewed unfocussed and so is perceived as remaining grey. So, we are quite tolerant of grey while reading but not while fixing upon it. Also, greyscaling generates better presentation of word images which match our expectations much more closely, especially in unfocussed areas. We have built in these expectations during many years of experience in reading. Therefore, we get the impression that greyscaled text has a higher and more acceptable resolution.

In an example of an embodiment, a video display with 1000×1000 pixels is taken as a basis combined with a preferred fine-raster of 8000×4000 fine-pixels (m=8, n=4). This enables positioning with an accuracy of more than ¼ pt during layout of the text page to be processed and printed.

Figure 5:
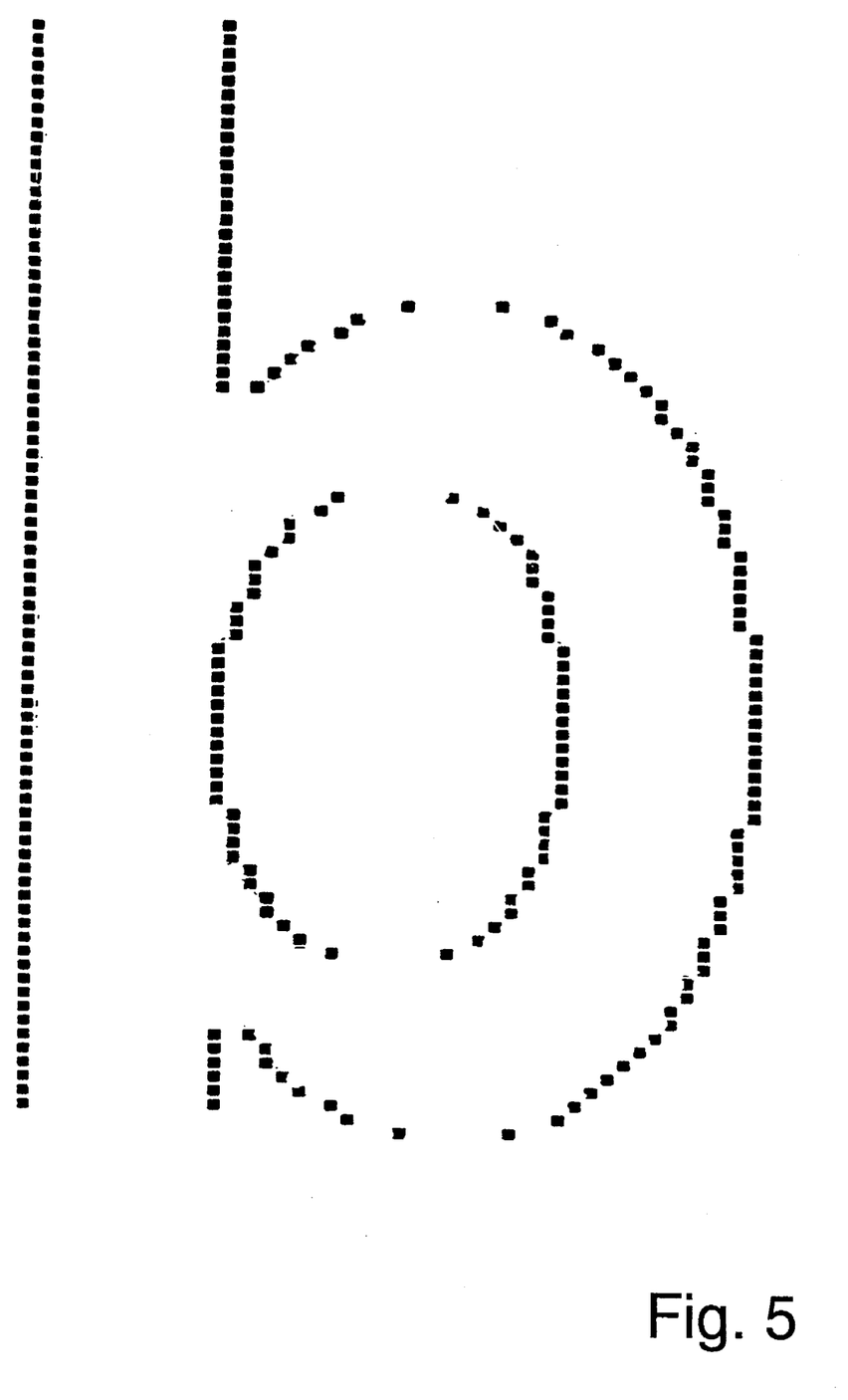
FIG. 5: shows a fine-rastered contour of the character b.
Figure 6:
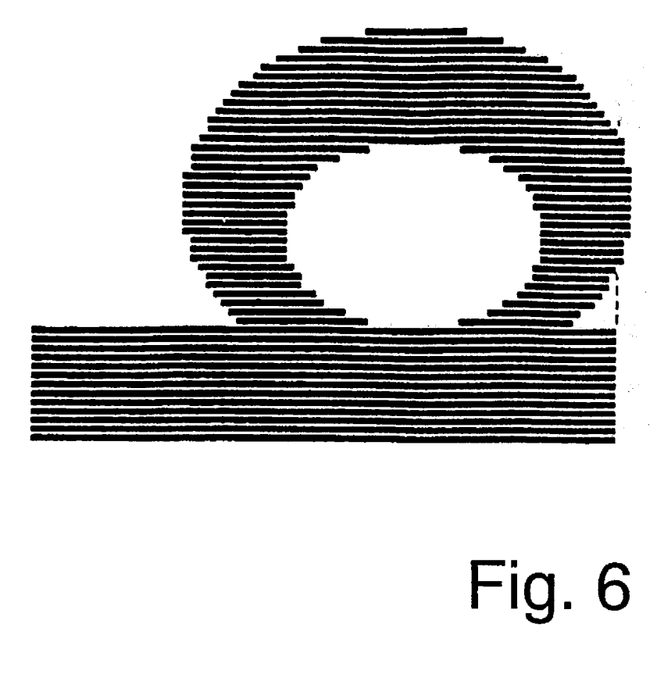
FIG. 6: shows a character b (rotated by 90°) in represented in a run lungth code.

In the method and apparatus of the invention the character positions are calculated in fine-raster units and they are scaled and rastered according to one of the known methods for intelligent outline scaling. Simpler methods could be used, however, because instructions will neither be needed nor executed. Therefore, the scaling step named gridfit is left out. The result of rasterisation is presented in FIG. 5. It shows the rastered contours produced by a gridwalk. The fourth scaling step was called bitfill and is also left out. Such rastered contours could be stored as bitmaps or coded with so-called run lengths. A run length is the number of either white or black pixels, counted by traversing one TV-line from left to right, thus passing through either white or black areas. FIG. 6 illustrates the run length coding, using the character b rotated by 90°. One black run length can described by stating its start location and its end point or its lenght in pixel units.

The preferred embodiment executes a gridwalk so that it stores TV-line by TV-line characters in a run length code, i.e. the start and end positions of black lines as in FIG. 6, without really needing a bitmap memory. These positions may be used to calculate grey-values without really collecting single bits and adding them up. In the following we assume a fine-raster with m=8, n=4 with the shift-x amount $S_x$ equal to $\log_2(m)=3$ and the shift-y amount $S_y$ equal to $\log_2(n)=2$. As an example, we consider the processing of one line of a character in the fine-raster, such as in FIG. 6. The number of the fine-raster lines in the run length code is given by Iy, and we represent the start position Is and the end position Ie of the black area of the fine-raster line Iy as the integer numbers of the repective fine-raster pixels. In order to get the y-location number or address of the screen line to which fine-raster line Iy belongs, Iy is shifted by $S_y=2$ bits (i.e. divided by 4 and truncated), which results in the desired screen raster line. The relevant screen pixel numbers of the line in x-direction are obtained by shifting Is and Ie by $S_x=3$ bits (divide by 8 and truncate) respectively, which gives the numbers of the first and the last screen pixel at least partly filled by the line. Thus, we get the x-locations of those screen pixels where we are going to add the value 8 (i.e. the line runs through these screen pixels): from (Is shift 3), (Is shift 3)+1, . . . (Ie shift 3)−1, wherein we do not add 8 to the last screen pixel since it is only partly filled with black pixels of the line (the same is true for the first screen pixel (Is shift 3) which will be taken into account by subtracting a subtraction value later). Regarding the last screen pixel involved in the line it is noted that the last $S_x=3$ bits of Ie specify the value to be added (addition-value) to the last screen pixel belonging to the line, namely the number of black fine-raster pixels therein. Thus, we add the integer value of the last three bits of Ie to the last screen pixel. Regarding the first screen pixel to which 8 was already added it must be taken into account that it may be only partly filled by the line; in this respect it may be noted that the last three bits of the binary representation of Is specify the number of white pixels in the first screen pixel to which 8 was already added. Therefore a subtraction-value to be subtracted from the first screen pixel in the line is determined by the value of the last $S_x=3$ bits of Is and subtracted from the content of the first screen pixel belonging to the line.

As a numerical example for the above method we take a run length coded line as in FIG. 6, which has for example Iy=17, Is=19, Ie=35 screen line address=4 (17 shift 2 bit)

X locations of screen pixels belonging to the line are determined by shift operations by 3 bits (divide by 8) to Is and Ie:

screen pixel 2 (19 shift 3) to 4 (35 shift 3);

The the value 8 is added to screen pixels 2, 3 (i.e. to all screen pixels except the last of the line);

For the first screen pixel involved a subtraction-value has to be determined because the line only partly covers this pixel:

subtraction-value Is−(Is shift 3)*8=19−2*8=3

The subtraction value is subtracted from the content of the first screen pixel (No. 2) to which 8 was already added;

For the last screen pixel involved (screen pixel 4) an addition-value is determined because it is partly filled by the line:

addition-value Ie−(Ie shift 3)*8=35−4*8=3

This addition-value is added to the last screen pixel (No. 4).

Result for the contibution of the line considered in the example to the content of screen pixels 2 to 4:

5 is added to pixel 2 (fine-pixels 17–19 white, the rest black)

8 is added to pixel 3 (fine-pixels 24–31 are black)

3 is added to pixel 4 (fine pixels 32–34 are black).

The same procedure is subsequently repeated for each line belonging to the character as shown for example in FIG. 6. The above example shows that when considering a character represented in run-length code of black lines in the fine-raster, the number of black fine-raster pixels falling into each screen pixel may be obtained by very simple operations like bit-shift and add-operations which can be executed very fast. It will now be apparent to those in the art that similar fast bit-shifting processes can be used for all the other relative m×n phase positions of the effective fine glyph raster with respect to the screen raster.

Figure 7:
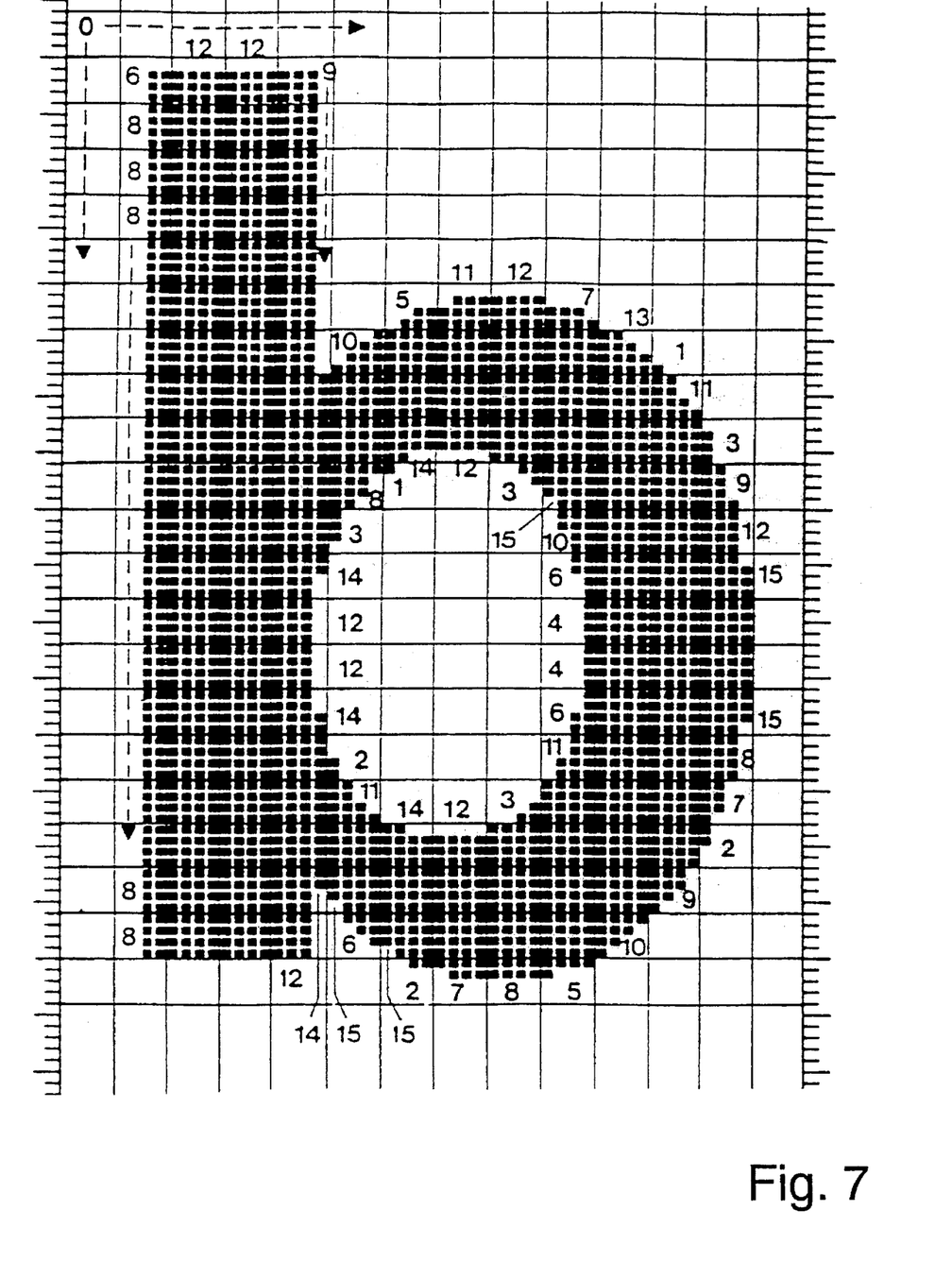
FIG. 7: shows a presentation of a character in a fine-raster which illustrates the summation of black fine-pixels in order to obtain grey values for screen pixels (m=4, n=4)

The result of a complete calculation of grey-values is shown in FIG. 7 (m=4, n=4). The digits show the accumulated bits which could be obtained by the above described method.

Figure 8:
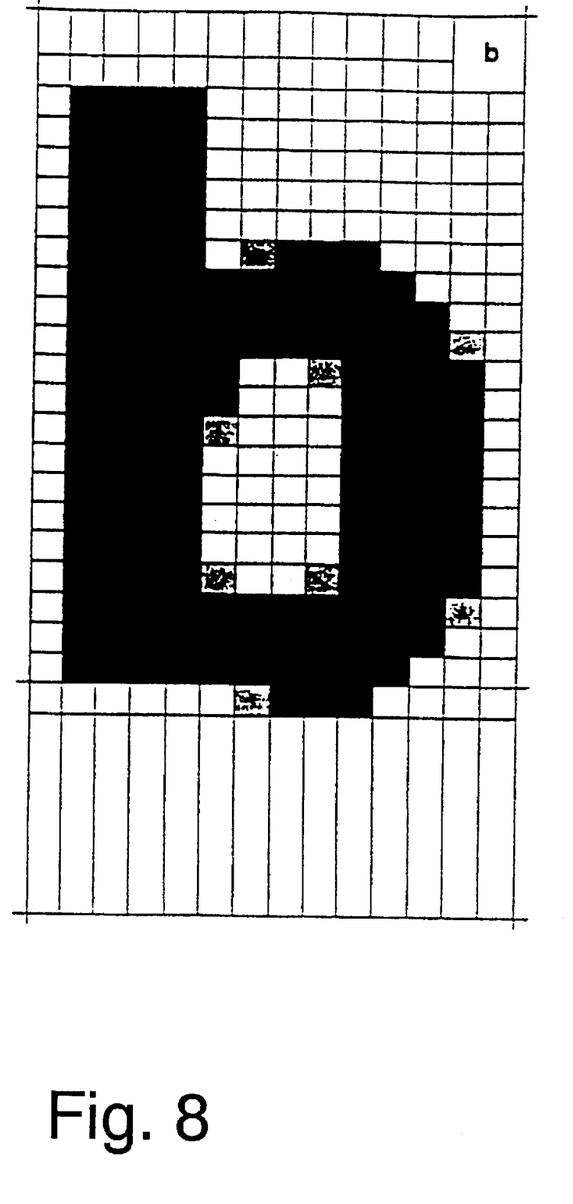
FIG. 8: shows an enlarged representation of a greyscaled character (m=4, n=4)

Such accumulated numbers could be used directly or indirectly (e.g., via a look-up table) to assign grey values to the screen pixels. The sum=0 is white, the sum=m×n is black, and any other value in-between 0 and m×n is grey according to either a linear or non-linear gradation. The gradation depends very much on the characteristics of a specific screen and the physics applied therein. The resulting greyscaled character is shown in FIG. 8.

The grey-value obtained for each pixel is transferred to the video refresh memory to the memory location corresponding to the respective pixel, preferably they are transferred to the memory by adding them to any content in the respective memory location.

Figure 9A:
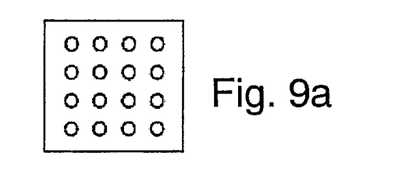
Figure 9B:
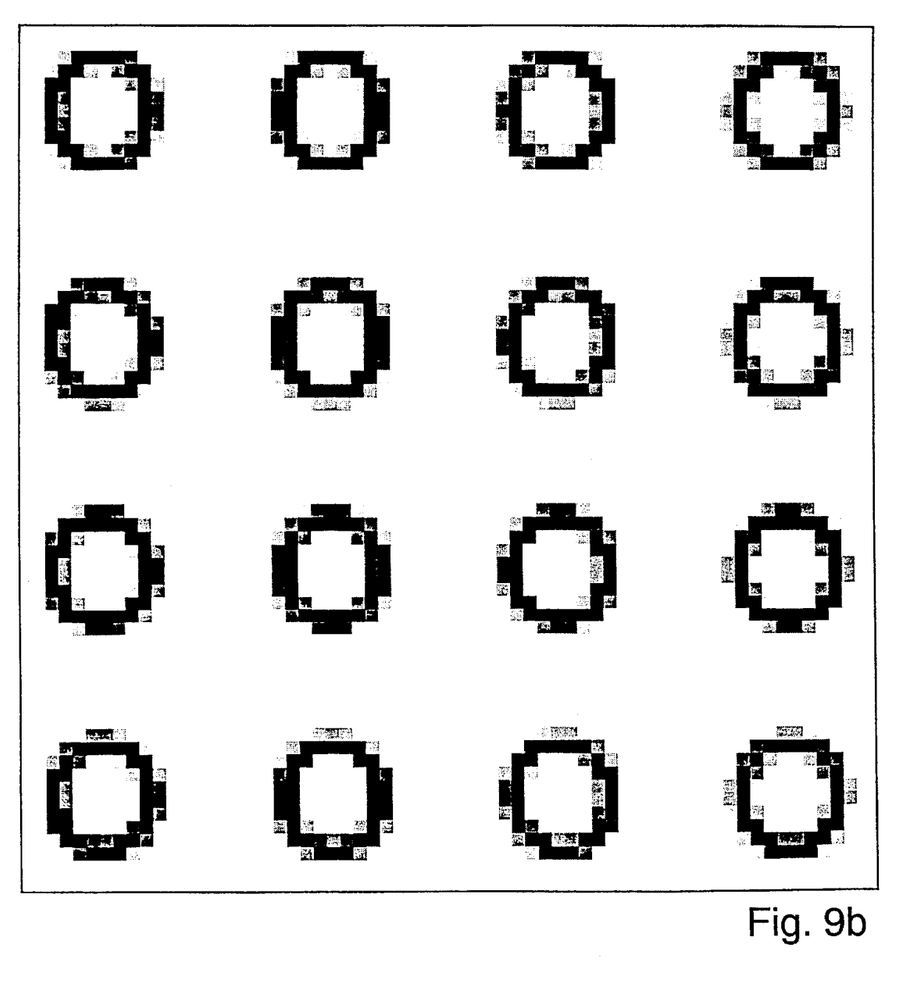

In FIG. 9*a*, we show 16 different results of grey scaling which belong to the case m=4, n=4. The different patterns or different possible ways of groups of m×n fine-pixels fall into respective screen pixels depend on the relative position of the character to the screen grid. The different grey variants of a character may be generated by application of consecutive shifts by 1 fine-pixel in the x- as well as in the y-direction. These are the m×n=16 character variants which are possible for each fine-rastered character depending on its position relative to the screen grid. The enlargements in FIG. 9*b* show these different grey variants for the same original character. These are the m×n=16 character variants which are possible for each fine-rastered character. These various images of the character O show differences in the grey value distribution and show how these differences contribute to a refined positioning and unexpected shift of the character O apparent visual position by a magnitude of a quarter of a screen pixel.

Additionally, the invention enables better readability and legibility, without increasing processing time, especially for glyphs in a smaller point size, and gives higher quality graphic presentation. The invention provides not only a greyscaling speed-up, but also flexibility with respect to pointsize (type size), position and possible glyph rotation.

The method is suitable for all kinds of alphabets aside from Latin characters, particularly for Kanji, as well as for all related graphic elements which could be described by strokes, curves and lines, as for example CAD-representations on video screens. The invention is suited for use in modern operating systems like the Mac-OS or MS Windows.

I claim:

1. A method for displaying text and graphics on a video display device comprising a screen with a display raster having a given number of pixels in the x- and a given number of consecutive lines in the y-direction, and a video refresh memory, said method using glyphs formatted in an intelligent outline description which are loaded from memory on demand and scaled, rotated, and positioned according to text processing requirements and rastered by pixels being located along their contours, said method comprising the steps of:

rasterising each glyph as it appears in the text processing requirements as necessary, in a high resolution fine-raster in which each screen pixel is more finely resolved with m fine-pixels in the x- and n fine-pixels in the y-direction, m and n being integers larger than 1, and in which each glyph is represented as run length code and stored in a cache-memory describing the positions of start and end transitions between white and black glyph strokes in the fine-raster, determining, depending on each glyph's position as provided by the text processing requirements, one out of m×n different positions of said stored fine-rastered glyph relative to the screen raster, there being m×n different possible positions for the fine-pixels of the glyph to fall as groups of m×n fine-pixels into respectively corresponding single screen pixels, summing, for each screen pixel the group of m×n fine-pixels falling in said screen pixel by calculating from start positions and end positions to determine a grey-value for said screen pixel, depending on the sum of black fine-pixels in relation to the number of m×n fine-pixels in register with said screen pixel at said determined position, and storing the determined grey value in the video refresh memory thus providing one out of m×n possible glyph variants from each cache-stored, fine-rastered glyph.

2. A method according to claim 1, wherein the grey-value of each screen pixel is determined as proportional to the sum of black fine-pixels positioned in the respective screen pixel.

3. A method according to claim 1, wherein m=8 and n=4.

4. A method according to claim 1, wherein m=4 and n=4.

5. A method for displaying text and graphics on a video display device comprising a screen with a display raster having a given number of pixels in the x- and a given number of consecutive lines in the y-direction, and a video refresh memory, said method using glyphs formatted in an intelligent outline description which are loaded from memory on demand and scaled, rotated, and positioned according to text processing requirements and rastered by pixels being located along their contours, said method comprising the steps of:

rasterising each glyph as it appears in the text processing requirements as necessary, in a high resolution fine-raster in which each screen pixel is more finely resolved with m fine-pixels in the x- and n fine-pixels in the y-direction, m and n being integers larger than 1, and in which each glyph is represented in a cache memory as a run length code describing the positions of start and end transitions between white and black glyph strokes in the fine-raster, determining, depending on each glyph's position as provided by the text processing requirements, one out of m×n possible different positions of said stored fine-rastered glyph relative to the screen raster, which m×n possible positions correspond to m×n different ways for the fine-pixels of the glyph to fall as respective groups of m×n fine-pixels into respective screen pixels, using each pair of said start and end positions to directly determine the corresponding start and end pixel of the screen and the number of filled fine-raster pixels contained therein and to add m-filled fine-raster pixels for all screen pixels between such determining start and end pixels of the screen to previously stored values therein including either preceding fine-raster scanlines of the same character or screen-pixel values of preceding characters into the video refresh memory to determine screen pixel grey values, said video refresh memory having a bit-depth sufficient to store the desired number of grey shades.

6. A method as in claim 5 wherein the grey-value of each screen pixel is determined as proportional to the sum of black fine-pixels positioned in the respective screen pixel.

7. A method as in claim 5 wherein m=8 and n=4.

8. A method as in claim 5 wherein m=4 and n=4.

9. Apparatus for displaying text and graphics on a video display device comprising a screen with a display raster having a given number of pixels in the x- and a given number of consecutive lines in the y-direction, and a video refresh memory, said apparatus using glyphs formatted in an intelligent outline description which are loaded from memory on demand and scaled, rotated, and positioned according to text processing requirements and rastered by pixels being located along their contours, said apparatus comprising:

means for rasterising each glyph as it appears in the text processing requirements as necessary, in a high resolution fine-raster in which each screen pixel is more finely resolved with m fine-pixels in the x- and n fine-pixels in the y-direction, m and n being integers larger than 1, and in which each glyph is represented as run length code and stored in a cache-memory describing the positions of start and end transitions between white and black glyph strokes in the fine-raster, means for determining, depending on each glyph's position as provided by the text processing requirements, one out of m×n different positions of said stored fine-rastered glyph relative to the screen raster, there being m×n different possible positions for the fine-pixels of the glyph to fall as groups of m×n fine-pixels into respectively corresponding single screen pixels, means for summing, for each screen pixel, the group of m×n fine-pixels falling in said screen pixel by calculating from start positions and end positions to determine a grey-value for said screen pixel, depending on the sum of black fine-pixels in relation to the number of m×n fine-pixels in register with said screen pixel at said determined position, and means for storing the determined grey value in the video refresh memory thus providing one out of m×n possible glyph variants from each cache-stored, fine-rastered glyph.

10. Apparatus according to claim 9 wherein the grey-value of each screen pixel is determined as proportional to the sum of black fine-pixels positioned in the respective screen pixel.

11. Apparatus for displaying text and graphics on a video display device comprising a screen with a display raster having a given number of pixels in the x- and a given number of consecutive lines in the y-direction, and a video refresh memory, said apparatus using glyphs formatted in an intelligent outline description which are loaded from memory on demand and scaled, rotated, and positioned according to text processing requirements and rastered by pixels being located along their contours, said apparatus comprising:

means for rasterising each glyph as it appears in the text processing requirements as necessary, in a high resolution fine-raster having horizontal scan lines, in which each screen pixel is more finely resolved with m fine-pixels in the x- and n fine-pixels in the y-direction, m and n being integers larger than 1, and in which each glyph is represented in a run length code describing the positions of start and end transitions between white and black of each of its black strokes in the fine-raster and stored in a cache-memory, means for determining, depending on each glyph's position as provided by the text processing requirements, one out of m×n possible different positions of said stored fine-rastered glyph relative to the screen raster, which m×n possible positions to m×n different ways for the fine-pixels of the glyph to fall as respective groups of m×n fine-pixels into respective screen pixels, means for using for each pair of said start and end positions, to directly determine the corresponding start and end pixel of the screen and the number of filled fine-raster pixels contained therein and to add m-filled fine-raster pixels for all screen pixels between such determined start and end pixels of the screen to previously stored values therein including either preceding fine-raster scanlines of the same character or screen-pixel values of preceding characters into the video refresh memory to determine screen pixel grey values, said video refresh memory having a bit-depth sufficient to store the desired number of grey shades.

12. Apparatus as in claim 11 wherein the grey-value of each screen pixel is determined as proportional to the sum of black fine-pixels positioned in the respective screen pixel.

13. Apparatus as in claim 11 wherein m=8 and n=4.

14. Apparatus as in claim 11 wherein m=4 and n=4.

* * * * *